United States Patent [19]

Boudot et al.

[11] 4,057,435

[45] Nov. 8, 1977

[54] OPTICAL GLASSES

[75] Inventors: Jean E. Boudot; Pascal A. J. Joly, both of Avon, France

[73] Assignee: Corning Glass Works, Corning, N.Y.

[21] Appl. No.: 730,809

[22] Filed: Oct. 8, 1976

[30] Foreign Application Priority Data

Apr. 16, 1976 France .............................. 76.11357

[51] Int. Cl.$^2$ .............................................. C03C 3/08
[52] U.S. Cl. .................................... 106/47 Q; 106/54
[58] Field of Search ................................ 106/47 Q, 54

[56] References Cited

U.S. PATENT DOCUMENTS

| | | | |
|---|---|---|---|
| 3,935,020 | 1/1976 | Deeg et al. | 106/47 Q |
| 3,960,579 | 6/1976 | Broemer et al. | 106/47 Q |

*Primary Examiner*—Winston A. Douglas
*Assistant Examiner*—Mark Bell
*Attorney, Agent, or Firm*—Milton M. Peterson; Clinton S. Janes, Jr.; Clarence R. Patty, Jr.

[57] ABSTRACT

Glasses are disclosed that have a high refractive index on the order of 1.7 or greater, a low density on the order of 3 gm./cm.$^3$, good chemical durability and a dispersive index on the order of 40 or more. These glasses belong to a $CaO$—$La_2O_3$—$TiO_2$—$B_2O_3$—$SiO_2$ family and are particularly useful in strong correction ophthalmic lenses and space optics.

3 Claims, No Drawings

OPTICAL GLASSES

BACKGROUND OF THE INVENTION

The present invention provides glasses which combine the optical characteristics of high refractive and dispersive indices with physical properties of low density and good chemical durability. This combination of properties is particularly required in such applications as high correction ophthalmic lenses and space optics where the weight factor becomes especially significant.

Glasses having a high refractive index and high dispersive index, also known as Abbe number, have been known at least since 1939 when U.S. Pat. No. 2,150,694 was granted to G. W. Morey. However, such glasses have normally employed relatively large contents of heavy metal oxides which contribute to a glass of high density. Recently, product applications have developed wherein light weight is of paramount importance. Thus, in space optics for example, it is necessary to optimize the ratio of load/power in rockets used in space experiments. Also, in ophthalmic lenses it is of interest to reduce lens weight and thereby provide more comfort to the wearer.

PRIOR ART

Within the broad scope of the Morey patent mentioned earlier, U.S. Pat. Nos. 2,434,146, No. 2,434,147 and No. 2,434,148, granted Jan. 6, 1948 to P. F. DePaolis, disclose borate glasses having high refractive and dispersive indices. The glasses disclosed in these patents are characterized by relatively large contents (18 to 33%) of lanthana and equally large contents of thoria and/or tungstic oxide to achieve the desired optic properties.

U.S. Pat. No. 2,745,757, granted May 15, 1956 to Walter Geffcken, discloses calcium borosilicate glasses containing large contents (26–44%) of lanthana and additions of zirconia, the presence of silica improving the chemical durability.

U.S. Pat. No. 3,477,863, granted Nov. 11, 1969 to H. Bromer et al., discloses borosilicates containing zirconia and titania together with large quantities of alkaline earth oxides. U.S. Pat. No. 3,960,579, granted June 1, 1976 to the same patentees, discloses a family of $BaO—Al_2O_3—TiO_2—SiO_2$ glasses that provides a combination of high refractive and dispersive indices.

SUMMARY OF THE INVENTION

The present invention is a borosilicate optical glass containing substantial quantities of titania, lime and lanthana, having a refractive index on the order of 1.7 or greater, a dispersive index on the order of 40 or greater, and a density on the order of 3 g./cm.$^3$. Preferably, the glass composition is selected from the following essential and non-essential components within the indicated ranges, calculated in weight percent on the oxide basis:

|          |           |         |
| -------- | --------- | ------- |
|          | $SiO_2$   | 0 – 15  |
|          | $B_2O_3$  | 30 – 54 |
| $SiO_2$ + | $B_2O_3$ | 42 – 54 |
|          | $TiO_2$   | 9 – 15  |
|          | $CaO$     | 18 – 28 |
|          | $BaO$     | 0 – 15  |
| $CaO$ +  | $BaO$     | 20 – 34 |
|          | $MgO$     | 0 – 5   |
|          | $Na_2O$   | 0 – 4   |
|          | $Li_2O$   | 0 – 4   |
| $Na_2O$ + | $Li_2O$ | 0 – 4   |

-continued

|           |         |
| --------- | ------- |
| $Al_2O_3$ | 0 – 5   |
| $La_2O_3$ | 9 – 15  |
| $Gd_2O_3$ | 0 – 5   |
| $Y_2O_3$  | 0 – 5   |
| $Nb_2O_5$ | 0 – 5   |
| $ZrO_2$   | 0 – 4   |
| $WO_3$    | 0 – 4   |
| $ZnO$     | 0 – 4   |

Heretofore, glasses having a high refractive index and a low density have tended to have a very low dispersive index. The dispersive index is normally determined for radiation at the D line and reported as $$V_D = n_D - \frac{1}{n_F - n_c}.$$

Glasses having a dispersive index below about 33, such as low density glasses have usually had, exhibit a chromatic aberration.

It is a primary purpose of the invention to provide low density glasses having a high refractive index on the order of 1.7 or more wherein the dispersive index is kept sufficiently high to minimize the prior problem of chromatic aberation. This is accomplished by using a borosilicate glass containing at least 30% by weight $B_2O_3$, a substantial amount of lanthana, and having high contents of lime and titania.

Another feature of the present glasses is their good chemical durability. This is particularly desirable in optical glasses which may be subjected to rather harsh chemical conditions during grinding and polishing and which must withstand weathering in service. A commonly used test of chemical durability is known as the AO test. Briefly, this test consists in measuring the weight loss of a glass sample after that sample is immersed in a 10% HCl solution for 10 minutes at 25° C. The test is further described in Applied Optics Magazine of May 1968, Vol. 7, #5, page 847.

The glasses of the present invention have resulted from the following observations with respect to constituent oxides when used within the ranges set forth:

$B_2O_3$ is not too dispersive, this giving a high Abbe's number, and does not raise the density much; this had not been observed in silicate glasses with a high titanium content.

CaO and MgO impart essentially the same optical properties as BaO, but give a much lower density. $La_2O_3$ is instrumental in providing a high Abbe's number with a good durability.

$TiO_2$ is of primary interest to impart a good durability to the glass.

The other oxides are added to improve either the fusibility, or the viscosity or the durability. For instance, $Nb_2O_5$, $ZrO_2$, $SiO_2$ and especially $Al_2O_3$ increase the durability.

The alkalies, $Li_2O$, $Na_2O$, and $K_2O$ are useful to provide low density, and $Li_2O$ and $Na_2O$ are needed for chemical strengthening by ion exchange.

Other oxides such as ZnO, $WO_3$, $Gd_2O_3$, $Y_2O_3$ can be added to the glass to adjust either the refractive index, or the Abbe's number, or the chemical durability.

Other additions in small quantity, such as decolorizing, fining, or coloring agents, can be made as required.

SPECIFIC EMBODIMENTS

The following table sets forth the compositions, in percent by weight as calculated from the glass batch on an oxide basis, of several glasses exemplary of the invention. The table also sets forth characteristic properties of the glasses including refractive index ($N_D$) and dispersive index (V), both measured at the D line of radiation, glass density (D) in grams/cubic centimeter (g./cm.$^3$), and weight loss (wt. loss) in milligrams per square centimeter of glass surface (mg./cm.$^2$), as measured in the AO test mentioned earlier.

| Example No. | COMPOSITION IN WEIGHT PERCENT | | | | | |
|---|---|---|---|---|---|---|
|  | 1 | 2 | 3 | 4 | 5 | 6 |
| $SiO_2$ | 10,78 | 10,67 | 10,00 | 10,00 | 9,62 | 9,62 |
| $B_2O_3$ | 36,70 | 36,34 | 42,53 | 42,53 | 40,89 | 40,89 |
| CaO | 24,33 | 22,11 | 18,22 | 24,82 | 23,86 | 27,71 |
| $TiO_2$ | 9,80 | 9,70 | 12,65 | 12,65 | 12,16 | 12,16 |
| $La_2O_3$ | 10,54 | 10,44 | 10,00 | 10,00 | 9,62 | 9,62 |
| $Al_2O_3$ | 3,93 | 3,89 | | | | |
| $ZrO_2$ | 1,96 | 2,93 | | | | |
| $Nb_2O_5$ | 1,96 | 1,94 | | | | |
| MgO | | 1,98 | | | | |
| BaO | | | 6,60 | | | |
| $Li_2O$ | | | | | 3,85 | |
| $N_D$ | 1,69987 | 1,69922 | 1,69477 | 1,70160 | 1,69876 | 1,70427 |
| V | 42,01 | 41,92 | 41,26 | 41,42 | 42,66 | 42,30 |
| D (g/cm$^3$) | 3,048 | 3,049 | 3,054 | 3,013 | 2,985 | 3,042 |
| Wt. loss (mg/cm$^2$) | 0,65 | 0,60 | 1,3 | 0,9 | 1,2 | 0,8 |

We claim:

1. A glass having a composition within the CaO—$La_2O_3$—$TiO_2$—$B_2O_3$—$SiO_2$ family and having a refractive index at least on the order of 1.7, a dispersive index at least on the order of 40, a density of about 3 g/cm$^3$, and a weight loss, as measured in the AO test, of less than 5 mg/cm$^2$, consisting essentially, as calculated in weight percent on the oxide basis, of about 18–28% CaO, 9–15% $La_2O_3$, 9–15% $TiO_2$, 30–54% $B_2O_3$, and the remainder $SiO_2$, the $SiO_2$ content not exceeding 15% and the sum of $B_2O_3$ + $SiO_2$ being about 30–54%.

2. A glass according to claim 1 also optionally containing at least one of the following components in the indicated proportions of 0–5% MgO, 0–15% BaO, the sum of BaO + CaO being about 20–34%, 0–4% $Na_2O$, 0–4% $Li_2O$, the sum of $Na_2O$ + $Li_2O$ being about 0–4%, 0–5% $Al_2O_3$, 0–5% $Gd_2O_3$, 0–5% $Y_2O_3$, 0–5% $Nb_2O_5$, 0–4% $ZrO_2$, 0–4% $WO_3$, and 0–4% ZnO.

3. A glass according to claim 1 wherein the $SiO_2$ content is about 9–11%, the $B_2O_3$ content is about 36–43%, the $TiO_2$ is about 9–13%, the CaO is about 18–28% and the $La_2O_3$ is about 9–11%.